United States Patent
Ulrich-Horn

(10) Patent No.: US 11,798,436 B2
(45) Date of Patent: Oct. 24, 2023

(54) SEALING FILM

(71) Applicant: Securikett Ulrich & Horn GmbH, Muenchendorf (AT)

(72) Inventor: Marietta Ulrich-Horn, Moedling (AT)

(73) Assignee: SECURIKETT ULRICH & HORN GMBH, Muenchendorf (AT)

(*) Notice: Subject to any disclaimer, the term of this patent is extended or adjusted under 35 U.S.C. 154(b) by 33 days.

(21) Appl. No.: 17/419,824

(22) PCT Filed: Apr. 17, 2020

(86) PCT No.: PCT/EP2020/060919
§ 371 (c)(1),
(2) Date: Jun. 30, 2021

(87) PCT Pub. No.: WO2020/212606
PCT Pub. Date: Oct. 22, 2020

(65) Prior Publication Data
US 2022/0058985 A1   Feb. 24, 2022

(30) Foreign Application Priority Data

Apr. 19, 2019  (EP) ..................................... 19170377

(51) Int. Cl.
*G09F 3/00* (2006.01)
*B32B 7/023* (2019.01)
(Continued)

(52) U.S. Cl.
CPC ............ *G09F 3/0292* (2013.01); *B32B 7/023* (2019.01); *B32B 7/14* (2013.01);
(Continued)

(58) Field of Classification Search
CPC ............ Y10T 428/14; Y10T 428/1419; Y10T 428/1452; Y10T 428/1457;
(Continued)

(56) References Cited

U.S. PATENT DOCUMENTS

| 8,307,983 | B2 | 11/2012 | Ludwig et al. |
| 11,124,011 | B2 | 9/2021 | Cathomen et al. |

(Continued)

FOREIGN PATENT DOCUMENTS

| AT | 9366 U1 | 8/2007 |
| CN | 101031480 A | 9/2007 |

(Continued)

OTHER PUBLICATIONS

Machine translation (Espacenet) of DE 102013110862 A1. Translated Jan. 29, 2022. (Year: 2022).*

(Continued)

*Primary Examiner* — Prashant J Khatri
*Assistant Examiner* — Ethan A. Utt
(74) *Attorney, Agent, or Firm* — Collard & Roe, P.C.

(57) ABSTRACT

A sealing film, comprising a carrier film and a plurality of functional layers comprising at least two color display layers and at least two adhesion-controlling layers, the sealing film having an adhesive layer for fastening to a base surface, the carrier film being at least partially detachable from the functional layers in order to bring the sealing film from a first state into a second state, at least one symbol arrangement being optically visible at least in a remainder in the second state, which at least one symbol arrangement is arranged in a first subregion and a second subregion. According to the invention, the functional layers and the adhesive layer are at least partially translucent and the functional layers comprise at least one additional color display layer and at least one additional adhesion-controlling layer, the functional layers being designed in such a way that the at least one symbol arrangement is optically better visible in the first subregion than in the second subregion on a light background and that the at least one symbol arrange- (Continued)

ment is optically better visible in the second subregion than in the first subregion on a dark background.

9 Claims, 2 Drawing Sheets

(51) Int. Cl.
*B32B 7/14* (2006.01)
*G09F 3/02* (2006.01)
(52) U.S. Cl.
CPC . *B32B 2307/4026* (2013.01); *B32B 2307/412* (2013.01); *B32B 2307/748* (2013.01); *B32B 2519/00* (2013.01); *G09F 2003/0257* (2013.01); *G09F 2003/0276* (2013.01)
(58) Field of Classification Search
CPC ......... Y10T 428/1467; Y10T 428/1476; Y10T 428/1486; Y10T 428/24802; Y10T 428/24851; Y10T 428/2486; Y10T 428/24868; Y10T 428/24876; Y10T 428/24884; Y10T 428/24893; Y10T 428/24942; Y10T 428/28; Y10T 428/2813; Y10T 428/2817; Y10T 428/2826; Y10T 428/283; Y10T 428/2839; Y10T 428/2848; Y10T 428/2852; Y10T 428/2857; Y10T 428/2878; Y10T 428/2891; B32B 7/00; B32B 7/02; B32B 7/023; B32B 7/04; B32B 7/05; B32B 7/06; B32B 7/12; B32B 33/00; B32B 2307/40; B32B 2307/402; B32B 2307/4023; B32B 2307/404; B32B 2307/412; B32B 2307/414; B32B 2307/70; B32B 2307/748; B32B 2405/00; B32B 2519/00; B32B 2581/00; G09F 3/00; G09F 3/02; G09F 3/0291; G09F 3/0292; G09F 3/0294; G09F 3/03; G09F 3/0305; G09F 3/0341; G09F 3/0376; G09F 3/0382; G09F 3/0388; G09F 3/04; G09F 3/08; G09F 3/10; G09F 2003/0208; G09F 2003/021; G09F 2003/0222; G09F 2003/0225; G09F 2003/0226; G09F 2003/0227; G09F 2003/023; G09F 2003/0239; G09F 2003/0241; G09F 2003/0242; G09F 2003/0245; G09F 2003/0248; G09F 2003/0251; G09F 2003/0255; G09F 2003/0257; G09F 2003/0263; G09F 2003/0264; G09F 2003/0272; G09F 2003/0276; G09F 2003/0277; G09F 2003/0285; C09J 7/00; C09J 7/20; C09J 7/201; C09J 7/203; C09J 7/22; C09J 7/24; C09J 7/241; C09J 7/243; C09J 7/25; C09J 7/255; C09J 7/29; C09J 7/30; C09J 7/32; C09J 7/35; C09J 7/38; C09J 7/381; C09J 7/383; C09J 7/385; C09J 7/40; C09J 2203/334; C09J 2203/338; C09J 2301/00; C09J 2301/10; C09J 2301/12; C09J 2301/122; C09J 2301/30; C09J 2301/302; C09J 2301/304; C09J 2301/306
USPC ......... 428/40.1, 40.5, 41.3, 41.4, 41.6, 41.8, 428/42.1, 195.1, 201, 202, 203, 204, 205, 428/206, 212, 343, 346, 347, 349, 350, 428/352, 354, 355 R, 356, 355 EN, 428/355 AC; 283/72, 74, 81, 94, 98, 100, 283/101, 107, 108, 109, 110, 113, 114
See application file for complete search history.

(56) References Cited

U.S. PATENT DOCUMENTS

2008/0020165 A1\* 1/2008 Drori .................... G09F 3/0292
428/40.1
2013/0134698 A1 5/2013 Mayrhofer et al.

FOREIGN PATENT DOCUMENTS

| CN | 103493118 A | 1/2014 | |
| CN | 107845322 A | 3/2018 | |
| CN | 108367587 A | 8/2018 | |
| DE | 202007001713 U1 | 6/2007 | |
| DE | 102013110862 A1 \* | 4/2015 | ............... G09F 3/02 |
| EP | 1 278 173 A2 | 1/2003 | |
| EP | 1 799 583 B1 | 7/2008 | |
| EP | 3 291 210 A1 | 3/2018 | |
| GB | 2 527 508 A | 12/2015 | |

OTHER PUBLICATIONS

International Search Report in PCT/EP2020/060919, dated Jun. 18, 2020.
European Search Report in EP 19170377.6-1201, dated Oct. 24, 2019, with English translation of relevant parts.
European Patent Office Decision to Grant in EP 19 170 377.6-1201, dated Dec. 3, 2020, with English translation.
English translation of the Chinese Office Action in 202080009030.2, dated Dec. 20, 2021.

\* cited by examiner

SEALING FILM

CROSS REFERENCE TO RELATED APPLICATIONS

This application is the National Stage of PCT/EP2020/060919 filed on Apr. 17, 2020, which claims priority under 35 U.S.C. § 119 of European Application No. 19170377.6 filed on Apr. 19, 2019, the disclosure of which is incorporated by reference. The international application under PCT article 21(2) was not published in English.

FIELD OF THE INVENTION

Sealing film for application to a base surface, comprising a carrier film and multiple functional layers, wherein the functional layers comprise at least two color display layers and at least two adhesion-controlling layers, wherein the sealing film has an adhesive layer for attachment to the base surface, wherein the functional layers are arranged between the carrier film and the adhesive layer, wherein the carrier film can be at least partially detached from the functional layers, in particular from the at least two color display layers, so as to bring the sealing film from a first state into a second state, wherein in the second state, the sealing film comprises a pulled-off layer and a remnant, wherein in the second state, at least one symbol arrangement is optically visible, at least in the remnant, which at least one symbol arrangement is arranged in a first sub-region and a second sub-region, wherein the at least two adhesion-controlling layers are provided so as to remove regions defined during detachment of the carrier film from the at least two color display layers, and to make the at least one symbol arrangement optically visible.

STATE OF THE ART

Sealing films are used to offer sufficient protection for the content of packaging elements, on the one hand, and to declare the untouched status of originally packaged goods, on the other hand. Once a packaging element has been opened, a user has access to its content and can manipulate this content.

For this reason, sealing films that are arranged in the region of opening tabs of the packaging elements are often used. In AT 009 366 U1, for example, a sealing film is disclosed, by means of which film opening of a packaging element that has taken place is clearly and irreversibly indicated. The sealing film has multiple layers that are partially connected with one another. By means of detachment of a carrier film, defined regions of the layers, in particular of a color layer, can be detached using at least one release varnish layer. As a result, a graphic object that was previously hidden to the observer becomes optically visible in an emblem region of the sealing film, and thereby opening of the packaging element that has taken place is clearly and irreversibly indicated.

It is a disadvantage of the known sealing film that a possible text, such as, for example, the product identification or the expiration date, and/or a possible logo and/or an image that is situated in the region of the opening tab of the packaging element is no longer legible/recognizable when the sealing film is applied to it, at least in part.

Furthermore, in the case of the known sealing film, it is not guaranteed that the graphic object is optically well visible both on a light base surface and on a dark base surface of the packaging element. In other words, upon application of the known sealing film to a dark base surface, for example, it can happen—if the known sealing film has a dark color layer—that the graphic symbol is not clearly visible optically, and that a user does not recognize whether the packaging element has already been opened before.

It is a further disadvantage of the known sealing film that when detaching the carrier film, a symbol that has only relatively low contrast is formed. This implies the risk that the observer will recognize only with difficulty, in the case of re-application of the carrier film, whether the sealing film was already detached, since manipulated and non-manipulated sealing films hardly differ from one another.

TASK OF THE INVENTION

It is therefore the task of the present invention to make available a sealing film that overcomes the aforementioned disadvantages of the state of the art and makes detachment optically well visible both on a light and on a dark base surface. Furthermore, a text arranged on the base surface and/or a logo arranged on the base surface and/or an image arranged on the base surface is supposed to be legible even if the sealing film according to the invention is applied to it at least in part.

PRESENTATION OF THE INVENTION

The task stated initially is accomplished, according to the invention, in the case of a sealing film for application to a base surface, comprising a carrier film and multiple functional layers, wherein the functional layers comprise at least two color display layers and at least two adhesion-controlling layers, wherein the sealing film has an adhesive layer for attachment to the base surface, wherein the functional layers are arranged between the carrier film and the adhesive layer, wherein the carrier film can be at least partially detached from the functional layers, in particular from the at least two color display layers, so as to bring the sealing film from a first state into a second state, wherein in the second state, the sealing film comprises a pulled-off layer and a remnant, wherein in the second state, at least one symbol arrangement is optically visible, at least in the remnant, which at least one symbol arrangement is arranged in a first sub-region and a second sub-region, wherein the at least two adhesion-controlling layers are provided so as to remove defined regions from the at least two color display layers during detachment of the carrier film, and to make the at least one symbol arrangement optically visible, in that the functional layers and the adhesive layer are at least partially translucent and that the functional layers comprise at least one further color display layer and at least one further adhesion-controlling layer, wherein by means of the at least partially translucent configuration of the functional layers, the at least one symbol arrangement in the first sub-region is better optically visible on a light base surface than in the second sub-region, and the at least one symbol arrangement in the second sub-region is better optically visible on a dark base surface than in the first sub-region, wherein the light base surface is optically lighter than the dark base surface.

The structure of the sealing film according to the invention can be summarized as follows: Multiple functional layers are applied between the carrier film and the adhesive layer, wherein the functional layers comprise at least three color display layers and at least three adhesion-controlling layers. During the course of detachment of the carrier film, the at least one symbol arrangement occurs in the first and second sub-region, wherein regions defined by the at least three adhesion-controlling layers are detached from a first color display layer and a second color display layer, and thereby the at least one symbol arrangement is formed.

In the second state, the sealing film according to the invention has a pulled-off layer and a remnant that remains adhering to the base surface. The at least one symbol arrangement is optically visible in the second state, at least on the remnant. In addition, the at least one symbol arrangement can also be optically visible on the pulled-off layer in the second state.

During the course of detachment, typically no defined regions are detached from the further color display layer, using the three adhesion-controlling layers. The further color display layer is usually at least partially transparent and can serve for separating the adhesive layer from the remaining functional layers.

It would also be conceivable that the further color display layer is carried out in a translucent color, and thereby the further color display layer ensures coloring on the remnant in the second state.

The at least one symbol arrangement remains hidden to an observer, for the most part or entirely, before opening of the sealing film according to the invention takes place for the first time (i.e. in the first state), and is only optically visible after opening has taken place (i.e. in the second state).

However, it would also be conceivable that even before first-time opening of the sealing film according to the invention (i.e. in the first state), a symbol arrangement is optically visible to the observer, but this changes noticeably after opening has taken place (i.e. in the second state). In other words, in this case the symbol arrangement is optically different before having been opened for the first time than from when it has been opened.

Of course, the detached defined regions of the corresponding color display layer do not have to adhere directly to the carrier film or to the adhesive layer in this regard, but rather can also adhere to them indirectly by way of functional layers arranged on the carrier film or on the adhesive layer.

After detachment of defined regions from the first and second color display layers by means of the at least three adhesion-controlling layers, the at least one symbol arrangement on the remnant is optically better visible on a light base surface, in the first sub-region, than in the second sub-region. In the second sub-region, the at least one symbol arrangement, on the other hand, is optically better visible on a dark base surface than in the first sub-region. In other words, a user can determine—independent of the color or brightness of the base surface—whether the sealing film according to the invention is in the second state, since the at least one symbol arrangement is optically well visible in one of the two sub-regions, in any case.

Of course, it would fundamentally also be conceivable that the symbol arrangement on the remnant is optically better visible on a dark base surface in the first sub-region than in the second sub-region. In the second sub-region, the at least one symbol arrangement, on the other hand, is optically better visible on a light base surface than in the first sub-region.

By means of the at least partially translucent configuration of the functional layers, in particular of the color display layers, the base surface to which the sealing film according to the invention was applied is optically visible both in the first state and in the second state. In other words, a text that might be standing on the base surface can be legible—in spite of application of the sealing film according to the invention onto this text.

Of course, an image and/or a logo can also be situated on the base surface, next to or instead of the text. An image and/or a logo can also be legible—in spite of application of the sealing film onto the image and/or the logo.

Of course, the sealing film according to the invention can also have any desired number of further functional layers in addition to the functional layers described, which have the goal of production technology advantages or optical effects, for example, without deviating from the idea according to the invention.

By means of the functional layers, something that is optically perceivable, for example a color, a symbol or a text, is produced or an effect occurs, for example by means of adhesion-controlling layers. In other words, "functional layers" is the umbrella term for the color display layers and the adhesion-controlling layers, for example.

The carrier film is a material layer. Of course, it would be conceivable that the functional layers, as well, comprise at least one further translucent, preferably transparent material layer.

The color display layers on the other hand can comprise multiple structural layers. In other words, independent of the color of a color display layer, the color display layer comprises one or more structural layers.

It would be conceivable that the functional layers are applied to one another preferably using flexographic printing methods, screen printing methods, letterpress printing methods, offset printing methods, or digital printing methods.

It would be conceivable that the color display layers have different translucent colors.

Of course, the color display layers can also have the same translucent color, in each instance. In this case, as well, at least one symbol arrangement can be visible in the second state, because light refraction of those parts of the color display layers that have been detached during the course of detachment, by means of the adhesion-reducing layers, changes.

The color display layers can be translucent or transparent. A translucent color display layer is at least partially permeable for light and can contain color pigments. In contrast to this, a transparent color display layer is practically entirely permeable for light and does not contain any color pigments—in other words such a color display layer is colorless.

Furthermore, it would be conceivable that the color display layers consist, in certain sections, in each instance, of different translucent colors that can be arranged in strip form or raster form or in the form of images and/or patterns, for example.

It should be mentioned that the functional layers do not necessarily have to extend over an entire surface area of the sealing film according to the invention, i.e. over the full area. In other words, it would be conceivable that one or more of the functional layers are arranged on the surface of the sealing film according to the invention only in certain sections, in each instance.

Of course, the sealing film according to the invention can comprise further characteristics, such as planned punched breaking points and/or perforations, for example, which serve for detection of manipulation.

It would also be conceivable that the sealing film according to the invention comprises characteristics such as hologram embossing, marking substances and/or identity codes, for example, which serve for proof of authenticity.

In a preferred embodiment of the sealing film according to the invention, it is provided that a first color display layer, a second color display layer, and the further color display layer are structured in at least two different colors.

Preferably, the at least two different colors have very great contrast values.

Within the scope of this invention, black, white and colorless or transparent are also considered colors.

It would be conceivable that the first color display layer and/or the second color display layer and/or the further color display layer consist of different colors, at least in certain sections, which colors are arranged in strip shape, for example.

Of course, the first color display layer and/or the second color display layer and/or the further color display layer can also contain just one color, in each instance.

Furthermore—as has already been explained above—the color display layers can also consist of the same color.

Particularly preferably, it is provided, in the case of the sealing film according to the invention, that the at least one symbol arrangement is optically visible, in the second state, in at least one of the at least two different colors of the at least two color display layers and the further color display layer. In this case, the at least one symbol arrangement is optically visible in one of the at least two colors of the three color display layers or in a mixed color of the at least two colors of the three color display layers.

A mixed color occurs, for example, from two color display layers that lie one on top of the other, wherein the color display layer that lies on top is not allowed to be opaque, in any case. In other words, for example a violet mixed color occurs if one of the two color display layers that lie one on top of the other is blue and another of the two color display layers that lie one on top of the other is red.

In a preferred embodiment of the sealing film according to the invention, it is provided that a first region that surrounds the at least one symbol arrangement in the first sub-region, at least in certain sections, is optically visible in a different color in the second state than the at least one symbol arrangement in the first sub-region, and that a second region, which surrounds the at least one symbol arrangement in the second sub-region, at least in certain sections, is optically visible in a different color than the at least one symbol arrangement in the second sub-region and in a different color than the first region.

In other words, in the at least one symbol arrangement as well as in the first region and in the second region, different colors are optically visible in the second state, in each instance.

The first sub-region therefore comprises a part of the symbol arrangement as well as the first region, while the second sub-region comprises a different part of the symbol arrangement as well as the second region.

The respective colors are selected in such a manner that the at least one symbol arrangement on the remnant is optically better visible on a light base surface in the first sub-region than in the second sub-region. In the second sub-region, the color is selected in such a manner that the at least one symbol arrangement on the other hand is optically better visible on a dark base surface than in the first sub-region.

Preferably, it is provided, in the case of the sealing film according to the invention, that in the second state at least two symbol arrangements are optically visible at least in part, which symbol arrangements are arranged in a first sub-region and in a second sub-region, in each instance.

Independent of the application direction and of the color or lightness of the base surface, at least two symbol arrangements are optically visible in the second state, at least in part.

In a preferred embodiment of the sealing film according to the invention, it is provided that the following functional layers are applied to the carrier film, one after the other, viewed in the direction of the adhesive layer:
a first adhesion-controlling layer,
a first color display layer,
a second adhesion-controlling layer,
a second color display layer,
the further adhesion-controlling layer,
the further color display layer.

This arrangement of the functional layers applied one on top of the other has proven itself in the practical experimental field, so as to make the at least one symbol arrangement as well as the first region optically visible on a light base surface in the second state, and to make the at least one symbol arrangement as well as the second region optically visible on a dark base surface.

Of course, it is conceivable that aside from the functional layers listed above, at least one further functional layer is present.

Preferably, it is provided, in the case of the sealing film according to the invention, that the adhesion-controlling layers are release varnish layers that reduce the adhesion capacity of the color display layers as compared with adjacent layers of the sealing film. The adhesion-controlling layers comprise the first adhesion-controlling layer, the second adhesion-controlling layer, as well as the further adhesion-controlling layer. The term "adjacent layer" comprises the functional layers as well as the carrier film.

A lower adhesion capacity is generated for defined regions of the color display layers as compared with the regions excluded by the defined regions, in that release varnish layers, in each instance, border on the color display layers, and thereby the color display layers in those defined regions of lesser adhesion capacity do not permanently connect with a functional layer that borders on the release varnish layer, in particular not with the carrier film, and therefore remain easy to detach. In contrast, the regions of the layers that border on one another and are excluded by the defined regions on the basis of this arrangement can permanently connect with one another.

However, it would fundamentally also be conceivable that the adhesion-controlling layers are layers that increase the adhesion capacity of the color display layers as compared with adjacent layers of the sealing film. The method of effect would then be precisely opposite to what was said above.

The release varnish layers are preferably translucent, particularly preferably transparent.

In a preferred embodiment of the sealing film according to the invention, it is provided that the release varnish layers comprise at least one silicone and/or at least one wax.

Thereby the adhesion capacity of those functional layers on which the release varnish layer borders is lowered to a precisely measured degree by means of the release varnish layer, in known manner, so that adjacent functional layers are adhesive to a lesser degree. The extent to which the adhesion capacity is reduced can be controlled, in particular, by way of the selection of the release varnish, by way of the layer thickness and/or by way of the concentration of the at least one silicone and/or of the at least one wax in the release varnish layer.

Particularly preferably, it is provided, in the case of the sealing film according to the invention, that the carrier film consists of transparent plastic. By means of the transparent configuration of the plastic, the color display layers arranged below it are well visible at all times, and it is evident whether the color display layers are distributed uniformly and therefore are untouched, or whether defined regions in the form of a symbol arrangement have already been detached from the surface of the color display layers and thereby manipulation of the sealing film according to the invention has taken place.

It is furthermore conceivable that in the case of the sealing film according to the invention, a tab is provided, which is directly or indirectly connected with the carrier film. In other words, in the sense of improved operating convenience, the sealing film according to the invention has the tab, which is connected with the carrier film but not with the adhesive layer even in the second state.

The tab serves for grasping the sealing film according to the invention.

For example, the tab is an integral part of the carrier film, but it can also be a separate part affixed to the carrier film by means of a suitable method such as welding or gluing.

It is also possible that the tab is an integral component of one of the functional layers or is affixed to one of the functional layers by means of a suitable method such as welding or gluing.

It is conceivable that a sign is imprinted in the region of the tab, which shows a user the location at which the sealing film according to the invention can advantageously be grasped for pulling it off.

BRIEF DESCRIPTION OF THE FIGURES

The invention will now be explained in greater detail using an exemplary embodiment. The drawings are examples and are intended to show the idea of the invention but by no means to restrict it or to reproduce it in conclusive manner.

In this regard, the figures show.

WAYS TO IMPLEMENT THE INVENTION

Figure 1:
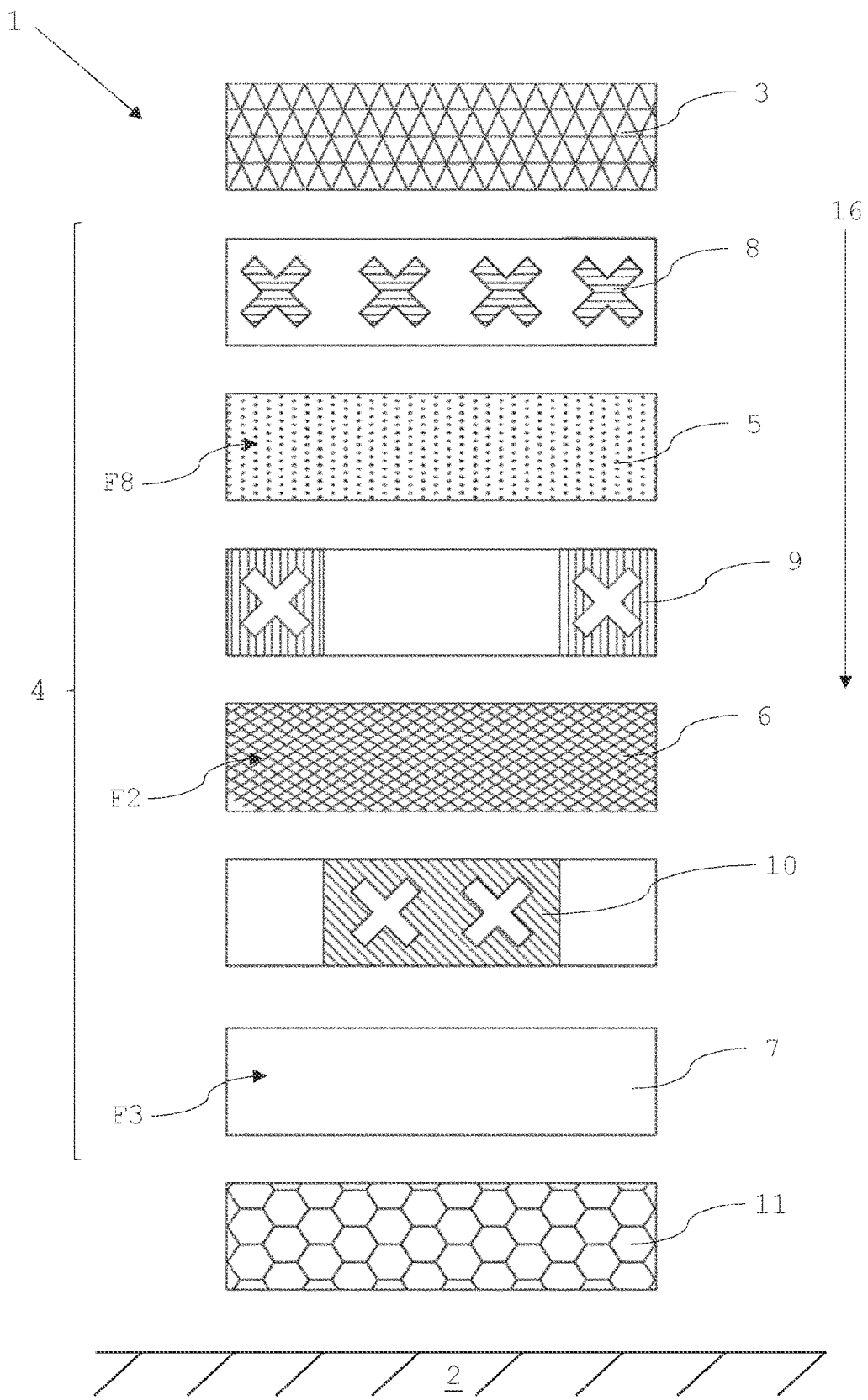
FIG. 1 a schematic representation of the structural structure of a sealing film according to the invention, FIG. 2a) a schematic representation of the sealing film according to the invention in a first state, FIG. 2b) a schematic representation of a layer of the sealing film according to the invention that has been pulled off, in a second state, after legitimate opening, FIG. 2 c) a schematic representation of a remnant of the sealing film according to the invention in the second state on a base surface after legitimate opening, and FIG. 2d) a schematic representation of a re-application of the layer pulled off after legitimate opening, glued back onto the remnant, in the second state.

FIG. 1 shows a schematic representation of a structural structure of a sealing film 1 according to the invention. It should be mentioned that within the scope of this invention, black, white, and colorless or transparent are viewed as being colors.

In the exemplary embodiment shown, a first layer of the sealing film 1 according to the invention, seen in a first direction 16, is a carrier film 3 that consists of a transparent plastic film, preferably of polypropylene or polyethylene or polyethylene terephthalate. The plastic film can be matte or glossy. Furthermore, it would be conceivable that the plastic film is tinted but not opaque.

A rearmost layer of the sealing film 1 according to the invention, seen in the first direction 16, is an adhesive layer 11 that can adhere to a base surface 2, wherein the base surface 2 is a sheet of paper, an imprinted cardboard or a plastic surface, for example. In other words, the sealing film 1 according to the invention, applied to the base surface 2 by means of the adhesive layer 11, can be released from the base surface 2 only by application of force. The self-adhesive function of the adhesive layer 11 can be protected by means of a film, for example, which is pulled off before application of or applying or affixing the sealing film 1 to the base surface 2. In order to guarantee such a solid connection with the surface of a base surface 2, a corresponding adhesive, for example a pressure-sensitive adhesive, must be used. The pressure-sensitive adhesive can be acrylic-based or natural-rubber-based, and it can be dispersed in water, dissolved in solvent or applied as a hot-melt glue, for example. Alternatively, a heat-sealing adhesive could also be used for the production of a solid connection between the sealing film 1 and the surface of the base surface 2.

In this exemplary embodiment, the adhesive layer 11 is configured to be transparent over its full area.

The following functional layers 4 are arranged between the carrier film 3 and the adhesive layer 11.

A first color display layer 5 lies behind the carrier film 3, viewed in a first direction 16, and in this exemplary embodiment is kept in a translucent color tone, namely translucent light-blue F8, over its full area. Fundamentally, however, the translucent color tone can be selected to be any color.

A first adhesion-controlling layer 8, which in the exemplary embodiment shown is a first release varnish layer 8, which comprises at least one silicone and/or at least one wax, is arranged between the carrier film 3 and the first color display layer 5.

It should be noted that alternative substance mixtures can also be used as release varnish layers 8, 9, 10.

However, it is essential, in this regard, that the release varnish layers 8, 9, 10 in the exemplary embodiment shown have suitable adhesion-reducing properties, so as to reduce an adhesion capacity of the layers (a functional layer 4) to which the corresponding release varnish layer 8, 9, 10 is applied to a precisely dimensioned degree, so that adjacent layers adhere or are adhesive to a lesser degree.

A second color display layer 6 is arranged behind the first color display layer 5, viewed in the first direction 16, which layer is translucent white F2 over its full area in this exemplary embodiment. The translucent color tone of the second color display layer 6 can, however, be chosen as desired. Preferably, the first color display layer 5 and the second color display layer 6 consist of contrasting translucent colors, and thereby at least one symbol arrangement 12 is formed during the course of the detachment process, in the case of a corresponding arrangement of the functional layers 4.

A second adhesion-controlling layer 9, which is a second release varnish layer 9 that comprises at least one silicone and/or at least one wax in the exemplary embodiment shown, is arranged between the first color display layer 5 and the second color display layer 6.

A further adhesion-controlling layer 10, which is a further release varnish layer 10 that comprises at least one silicone and/or at least one wax in the exemplary embodiment shown, is arranged behind the second color display layer 6, viewed in the first direction 16, as is a further color display layer 7 that lies behind the further adhesion-controlling layer 10. In this exemplary embodiment, the further color display layer 7 is translucent colorless F3. However, the translucent color tone of the further color display layer 7 can fundamentally be selected as desired.

In this exemplary embodiment, the functional layers 4 thereby comprise, viewed in the first direction 16, the first release varnish layer 8, the first color display layer 5, the second release varnish layer 9, the second color display layer 6, the further release varnish layer 10, and the further color display layer 7.

Figure 2A:
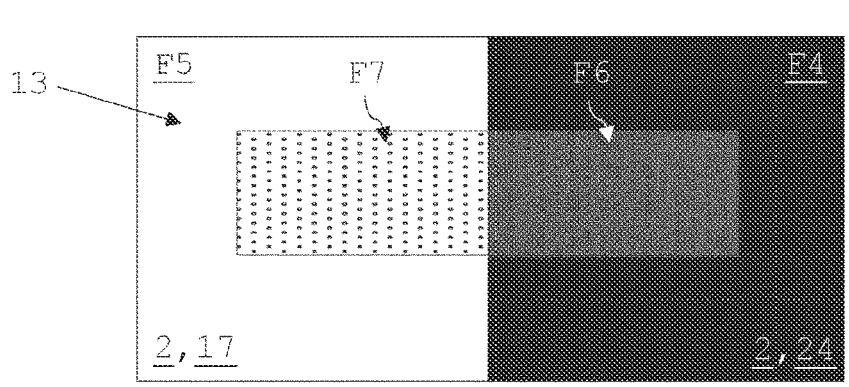

Before being glued onto the base surface 2, the sealing film 1 appears to be translucent blue F1. The translucent blue F1 color tone results from intimate contact of the functional layers 4 along with the carrier film 3 and adhesive layer 11. In particular, the translucent light-blue F8 color tone of the first color display layer 5 and the translucent white F2 color tone of the second color display layer 6 contribute to this. FIG. 2a) to d) show the sealing film according to the invention in a first state 13 (FIG. 2a)) and in a second state 14 after having been opened (FIG. 2b) to FIG. 2d)).

FIG. 2a) shows a schematic representation of the sealing film 1 according to the invention in a first state 13, which film is glued onto a two-color base surface 2. One region of the base surface 2 is white F5, while another region of the base surface 2 is black F4. The white F5 region of the base surface 2 forms a light base surface 17, and the black F4 region of the base surface 2 forms a dark base surface 24. In this regard, the light base surface 17 is optically lighter than the dark base surface 24. In this regard, the sealing film 1 according to the invention is glued onto the base surface 2 in such a manner that half of the sealing film 1 according to the invention is arranged on the white F5 region of the base surface 2, and the other half of the sealing film 1 according to the invention is arranged on the black F4 region of the base surface 2.

The sealing film 1 according to the invention is arranged on the base surface 2 using the adhesive layer 11, and is closed, i.e. it was not previously manipulated. By means of the translucent functional layers 4 of the sealing film 1 according to the invention, the film appears in a blue-black F6 color tone, which is composed of the black F4 color tone of the base surface 2 and the translucent blue F1 color tone of the sealing film 1, on the black F4 region of the base surface 2. In contrast to this, the sealing film 1 according to the invention appears in a blue F7 color tone, which is composed of the white color tone F5 of the base surface 2 and the translucent blue color tone F1 of the sealing film 1, on the white color tone F5 region of the base surface 2.

Of course, it would be conceivable that the sealing film 1 according to the invention has different translucent color tones and/or color combinations in the first state 13 as well as also in the second state 14.

During the detachment process—in other words at the transition from the first state 13 to the second state 14—the carrier film 3 is partially separated from the functional layers 4. In the second state 14, the sealing film 1 according to the invention is accordingly composed of two parts, namely of a pulled-off layer 18 and of a remnant 19, which remains on the base surface 2. Both in the pulled-off layer 18 and in the remnant 19, two symmetrically arranged symbol arrangements 12 can be seen in the exemplary embodiment shown, in the second state 14, which are arranged in a first sub-region 15 and in a second sub-region 20, in each instance. Within the two first sub-regions 15, in the second state 14, in each instance, a symbol 25 is optically visible, which is surrounded by a first region 21. Within the two second sub-regions 20, in the second state 14, in each instance, a symbol 25 is optically visible, which is surrounded by a second region 23. Thereby four symbols 25, in each instance, are optically visible in the pulled-off layer 18 and in the remnant 19, in the second state 14, wherein each is structured in the shape of an "X." Of course, however, it would be possible that the symbols 25 have any desired shape.

Figure 2B:
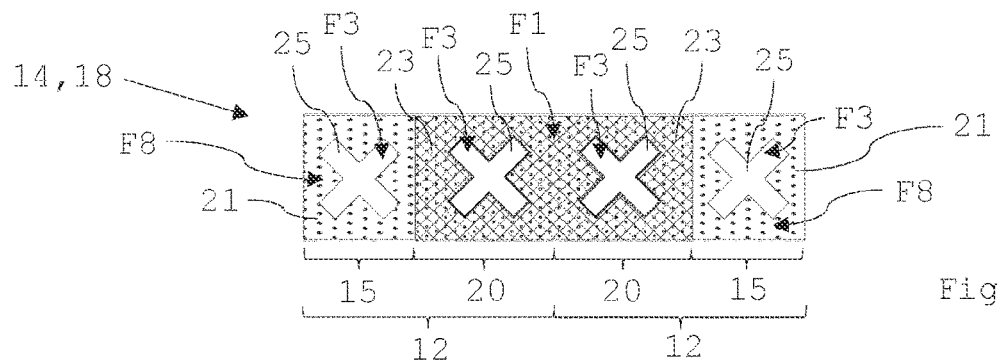

FIG. 2b) shows a schematic representation of the pulled-off layer 18 of the sealing film 1 according to the invention in the second state 14, after legitimate opening. The pulled-off layer 18 is the carrier film 3 including the color display layers 5, 6 adhering to the carrier layer 3, in the second state 14.

Figure 2C:
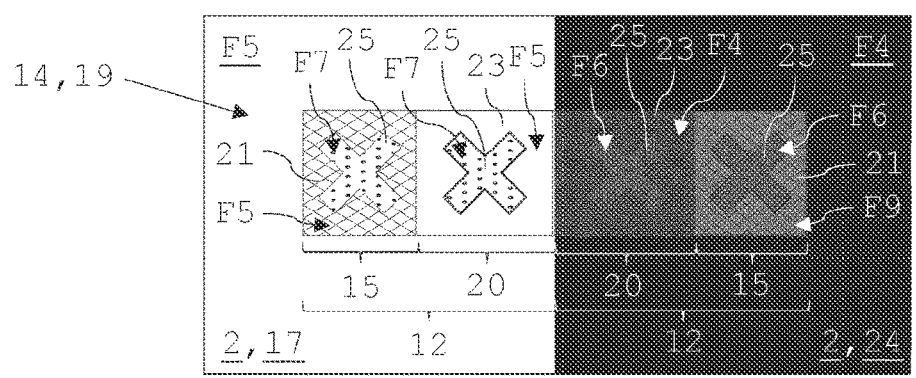

FIG. 2c) shows a schematic representation of the remnant 19 of the sealing film 1 according to the invention in the second state 14, on the base surface 2, after legitimate opening. The remnant 19 is the parts of the functional layers 4 that remain on the base surface 2 plus the adhesive layer 11, in the second state 14.

In the second state 14, two symbol arrangements 12, which are formed during detachment of the carrier film 3 and comprise four symbols 25, are now optically visible, both in the pulled-off layer 18 and in the remnant 19.

In the remnant 19 (see FIG. 2c)), one of the two symbol arrangements 12 is situated on the white F5 region of the base surface 2 (in other words on the light base surface 17), and the other of the two symbol arrangements 12 is situated on the black F2 region of the base surface 2 (in other words on the dark base surface 2).

It should be particularly emphasized that the colors that are optically visible in the second state 14, on the remnant 19 that adheres to the base surface 2, are composed of the color tones of the parts of the translucent functional layers 4 that remain on the base surface 2, and of the color tone of the base surface 2.

The first release varnish layer 8 ensures the color formation of the four symbols 25. All four symbols are optically visible in a translucent colorless F3 color tone on the pulled-off layer 18. On the other hand, on the remnant 19, the color tone of the symbols 25 is dependent on the color tone of the base surface 2. Those two symbols 25 that are situated on the black F4 base surface 2 are optically visible on the remnant 19 in a blue-black F6 color tone (composed of the translucent blue F1 total color tone of the color display layers 5, 6, 7 as well as of the black F4 color tone of the base surface 2). The two symbols 25 that are situated on the white F5 base surface 2 are optically visible on the remnant 19 in a blue F7 color tone (composed of the translucent blue F1 total color tone of the color display layers 5, 6, 7 as well as of the white F5 color tone of the base surface 2).

The second release varnish layer 9 ensures that the first regions 21 of the second color display layer 6 and of the further color display layer 7, which first regions 21 surround the two symbols 25 in the first sub-regions 15, remain on the remnant 19. Accordingly, on the pulled-off layer 18, the first regions 21 are optically visible in a translucent light-blue F8 color tone. On the other hand, on the remnant 19 the color tone of the first regions 21 is dependent on the color tone of the base surface 2. The first region 21 that is situated on the black F4 base surface 2 is optically visible on the remnant 19 in a gray F9 color tone (composed of the translucent white F2 and translucent colorless F3 color tone of the color display layers 6, 7 as well as of the black F4 color tone of the base surface 2). The first region 21 that is situated on the white F5 base surface 2 is optically visible on the remnant 19 in a white F5 color tone (composed of the translucent white F2 and translucent colorless F3 color tone of the color display layers 6, 7 as well as the white F5 color tone of the base surface 2).

The further release varnish layer 10 is responsible for the fact that the second regions 23 of the color display layer 7, which second regions 23 surround the two symbols 25 in the second sub-regions 20, remain on the remnant 19. Accordingly, the second regions 23 are optically visible in a translucent blue F1 color tone on the pulled-off layer 18. On the other hand, on the remnant 19 the color tone of the second regions 23 is dependent on the color tone of the base surface 2. The second region 23 that is situated on the black F4 base surface 2 is optically visible on the remnant 19 in a black F4 color tone (composed of the translucent colorless F3 color tone of the color display layer 7 and of the black F4 color tone of the base surface 2). the second region 23 that is situated on the white F5 base surface 2 is optically visible on the remnant 19 in a white F5 color tone (composed of the translucent colorless F3 color tone of the color display layer 7 and the white F5 color tone of the base surface 2).

Figure 2D:
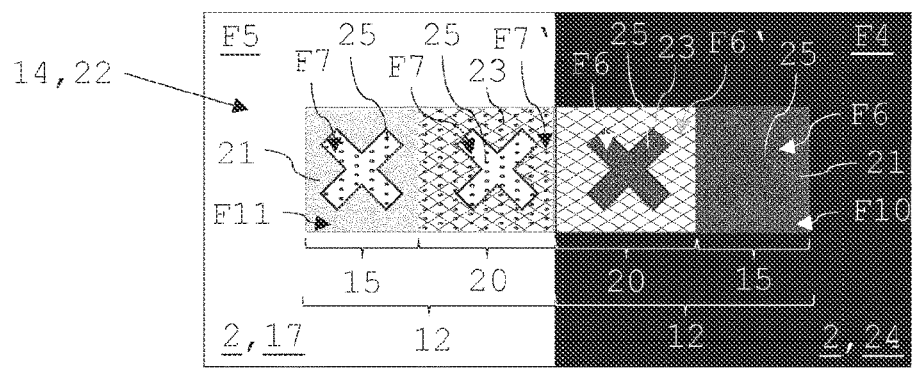

FIG. 2d) shows a schematic representation of a re-application 22 of the pulled-off layer 18, which has been glued back onto the remnant 19 in the second state 14 after detachment. It is evident that the symbol arrangements 12 are visible on the remnant 19 even after the re-application 22 of the pulled-off layer 18 to the remnant 19. In other words, manipulation of the sealing film 1 according to the invention that took place before the re-application 22 is indicated by a clear indication of the second state 14, in that the symbol arrangements 12 are visible even after the re-application 22.

The regions that are situated one on top of the other after the re-application 22 do not result in any "strong" mixed colors, because no intimate contact between the functional layers 4 occurs during the re-application 22. Rough surfaces occur between the pulled-off layer 18 and the remnant 19 due to the detachment of the carrier film 3 including the color display layers 5, 6 that adhere to the carrier film 3. As a result, as described above, no intimate contact can be produced between the pulled-off layer 18 and the remnant 19 during the re-application 22. In addition, during the course of the re-application 22, air collects between the pulled-off layer 18 and the remnant 19; this air can no longer escape completely after the re-application 22, and this also contributes to the fact that the color tones are visible in optically changed manner.

On the re-application 22, the two symbols 25 that are situated on the black F4 base surface 2 are optically visible in a blue-black F6 color tone (composed of the translucent colorless F3 color tone of the symbols 25 on the pulled-off layer 18 as well as of the blue-black F6 color tone of the symbols 25 on the remnant 19). The two symbols 25 that are situated on the white F5 base surface 2 are optically visible in a blue F7 color tone (composed of the translucent colorless F3 color tone of the symbols 25 on the pulled-off layer 18 as well as of the blue F7 color tone of the symbols 25 on the remnant 19).

The first region 21 that is situated on the black F4 base surface is optically visible in a light-blue-gray F10 color tone (composed of the translucent light-blue F8 color tone of the first region 21 on the pulled-off layer 18 as well as of the gray F9 color tone of the first region 21 on the remnant 19) on the re-application 22. The first region 21 that is situated on the white F5 base surface 2 is optically visible in a light-blue F11 color tone (composed of the translucent light-blue F8 color tone of the first region 21 on the pulled-off layer 18 as well as of the white F5 color tone of the first region 21 on the residue) on the re-application 22.

The second region 23 that is situated on the black F4 base surface 2 is optically visible in a blue-black F6' color tone (composed of the translucent blue F1 color tone of the second region 23 on the pulled-off layer 18 as well as of the black F4 color tone of the second region 23 on the remnant 19) on the re-application 22. The blue-black F6' color tone of the second region 23 differs slightly from the blue-black F6 color tone of the symbols 25 that are situated on the black F4 base surface 2. This is true, among other things, because during the re-application 22—as described above—no strong mixed colors occur, since no intimate contact takes place between the functional layers 4.

The second region 23 that is situated on the white F5 base surface is optically visible in a blue F7' color tone (composed of the translucent blue F1 color tone of the second region 23 on the pulled-off layer 18 as well as of the white F5 color tone of the second region 23 on the remnant 19) on the re-application 22. Here, too the blue F7' color tone of the second region 23 differs slightly from the blue F7 color tone of the symbols 25 that are situated on the white F5 base surface, for the reasons stated above.

Therefore—independent of whether the sealing film 1 according to the invention has been glued onto a dark or light base surface 2—in the second state 14 one sub-region 15, 20 is better visible both on the remnant 19 and after the re-application 22 than the other sub-region 20, 15. As a result, a user can immediately recognize whether the sealing film 1 according to the invention is in the first state 13 or in the second state 14.

Furthermore, a user—independent of whether the sealing film 1 according to the invention is in the first state 13 or in the second state 14—can fundamentally read a text arranged on the base surface, above which text the sealing film according to the invention is arranged, as long as the contrast between the color of the base surface 2 and the color of the text is strong enough. The same holds true, of course, also for a logo and/or an image.

REFERENCE SYMBOL LIST 1 sealing film
2 base surface
3 carrier film
4 functional layers
5 first color display layer
6 second color display layer
7 further color display layer
8 first adhesion-controlling layer or first release varnish layer
9 second adhesion-controlling layer or second release varnish layer
10 further adhesion-controlling layer or further release varnish layer
11 adhesive layer
12 symbol arrangement
13 first state
14 second state
15 first sub-region
16 first direction
17 light base surface
18 pulled-off layer
19 remnant
20 second sub-region
21 first region
22 re-application
23 second region
24 dark base surface
25 symbol
F1 translucent blue
F2 translucent white
F3 transparent
F4 black
F5 white
F6, F6' blue-black
F7, F7' blue F8 translucent light-blue
F9 gray
F10 light-blue-gray
F11 light blue

The invention claimed is:

1. A sealing film for application to a base surface, comprising:
a carrier film and
multiple functional layers,
wherein the multiple functional layers comprise at least two color display layers and at least two adhesion-controlling layers,
wherein the sealing film has an adhesive layer for attachment to the base surface,
wherein the multiple functional layers are arranged between the carrier film and the adhesive layer,
wherein the carrier film can be at least partially detached from the multiple functional layers, so as to bring the sealing film from a first state into a second state,
wherein in the second state, the sealing film comprises a pulled-off layer and a remnant,
wherein in the second state, at least one symbol arrangement is optically visible, at least in the remnant, which at least one symbol arrangement is arranged in a first sub-region and a second sub-region,
wherein the at least two adhesion-controlling layers are provided so as to remove regions defined during detachment of the carrier film from the at least two color display layers, and to make the at least one symbol arrangement optically visible,
wherein the multiple functional layers and the adhesive layer are at least partially translucent and extend to the edges of the sealing film, such that a text standing on the base surface is legible and the multiple functional layers comprise at least one further color display layer, in addition to the at least two color display layers and at least one further adhesion-controlling layer, in addition to the at least two adhesion-controlling layers,
wherein by means of the at least partially translucent configuration of the multiple functional layers, the at least one symbol arrangement in the first sub-region is better optically visible on a light base surface than in the second sub-region, and the at least one symbol arrangement in the second sub-region is better optically visible on a dark base surface than in the first sub-region,
wherein the light base surface is optically lighter than the dark base surface, and
wherein the base surface is optically visible both in the first state and in the second state when the sealing film is applied to the base surface.

2. The sealing film according to claim 1, wherein a first color display layer, a second color display layer, and the at least one further color display layer are structured in at least two different colors.

3. The sealing film according to claim 2, wherein the at least one symbol arrangement is optically visible in at least one of the at least two different colors of the at least two color display layers and the at least one further color display layer in the second state.

4. The sealing film according to claim 1, wherein a first region that surrounds the at least one symbol arrangement in the first sub-region, at least in certain sections, is optically visible in a different color in the second state than the at least one symbol arrangement in the first sub-region, and wherein a second region, which surrounds the at least one symbol arrangement in the second sub-region, at least in certain sections, is optically visible in a different color than the at least one symbol arrangement in the second sub-region and in a different color than the first region.

5. The sealing film according to claim 1, wherein in the second state at least two symbol arrangements are optically visible at least in part, which at least two symbol arrangements are arranged in a first sub-region and in a second sub-region, in each instance.

6. The sealing film according to claim 1, wherein the following functional layers are applied, one behind the other, on the carrier film, seen in the direction of the adhesive layer:
a first adhesion-controlling layer of the at least two adhesion-controlling layers,
a first color display layer of the at least two color display layers,
a second adhesion-controlling layer of the at least two adhesion-controlling layers,
a second color display layer of the at least two color display layers,
the at least one further adhesion-controlling layer, and
the at least one further color display layer.

7. The sealing film according to claim 1, wherein the at least two adhesion-controlling layers and the at least one further adhesion-controlling layer are release varnish layers that reduce the adhesion capacity of the at least two color display layers and the at least one further color display layer as compared with adjacent layers of the sealing film.

8. The sealing film according to claim 7, wherein the release varnish layers comprise at least one of a silicone and a wax.

9. The sealing film according to claim 1, wherein the carrier film consists of transparent plastic.

* * * * *